INVENTOR.

Harry Dvorkin

3,306,011
AIR FILTER FOR INFLATABLE TIRES
Harry Dvorkin, Inglewood, Calif.
(6243 Morse Ave., North Hollywood, Calif. 91601)
Filed May 28, 1964, Ser. No. 370,817
5 Claims. (Cl. 55—275)

Compressed air obtained at air pumps at gas stations in spite of filtering can contain moisture. Ozone which cracks rubber can also be present. Air pressure gauges which are used at gas stations have a large use and may be inaccurate.

This invention generally relates to compressed air filtering and more particularly to the removal of moisture, ozone or other foreign matter from compressed air entering an inflatable tire.

An object of the invention is to provide an air filtering means which is simple in construction, easy in use, well adapted for its intended purposes and relatively inexpensive to manufacture.

Another object of the invention is to use an air pressure gauge in combination with an air filter, in a filter receptacle having fittings adapted to its air-tight placement between an air accumulator valve and a tire valve stem, allowing the operator to inflate and check the air pressure of a tire without removing the filter receptacle from the tire valve stem.

Another object of the invention is to provide a visual means of determining moisture absorbing limits of a replaceable air filter in a filter receptacle.

Another object of the invention is to provide a threaded portion on one fitting of a filter receptacle, containing an air filter, to allow its attachment to the threaded portion of a tire valve stem, the other fitting adapted for placement in the opening of an air accumulator valve.

Another object of the invention is to provide in combination with an inflatable tire and air accumulator valve, an air filter in an air filter receptacle, that could direct an air stream over surfaces of enclosed activated charcoal, carbon derivatives, foam rubber, or any other ozone absorbent desiccant agent, or any water soluble dye.

Another object of the invention is to have an air filter containing dehydrating desiccant agents, activated charcoal, carbon derivatives, or foam rubber, at any point in an air accumulator system consisting of an air compressor, compressed air hoses, and air accumulator valves, to remove ozone and moisture.

Still another object of the invention is to provide an air filter, containing dehydrating agents, activated charcoal or any carbon derivatives contained in an air filter receptacle with fittings, that allow engagement with an inflatable tire stem valve and an air accumulator valve, the said air filter receptacle being used as a tire gauge.

These together with other objects and advantages which will become subsequently apparent, reside in the details of construction and operation as more fully hereinafter described and claimed, references being had to the accompanying drawing forming a part hereof, wherein like numerals refer to like parts throughout and in which:

Figure 1:
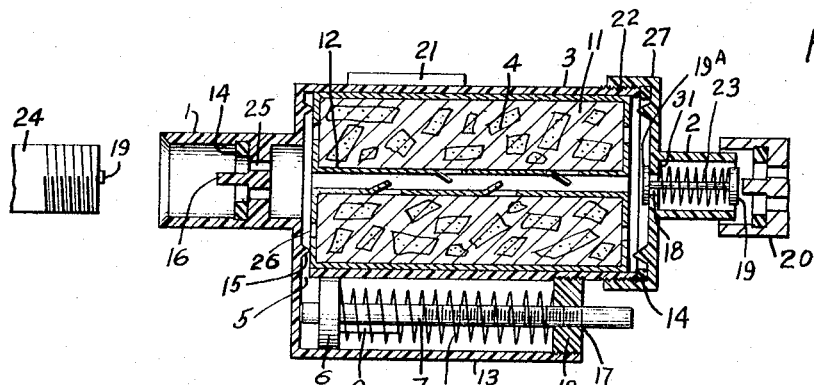
FIGURE 1 is a fragmentary longitudinal sectional view of the invention showing a filter receptacle, air filter, air pressure gauge and fittings positioned between a tire valve stem of an inflatable tire and an air accumulator valve of a compressed air system.
Figures 5, 6:
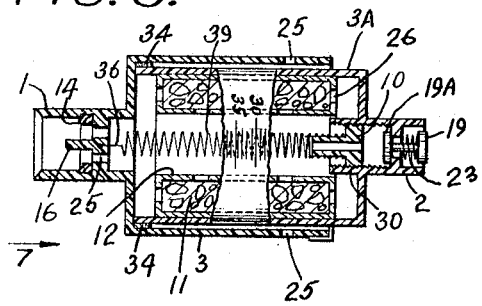

FIGURE 5 is a side elevation of another embodiment of an air pressure gauge that may be part of the device in FIGURE 1, showing an inflatable expandable bellows held in folded position by a compression spring, calibrated strips encircling a bellows and compression spring, indicating air pressure when fitting 1 of the device is brought to pressure engagement with a tire stem valve of an inflatable tire.

Figure 2:
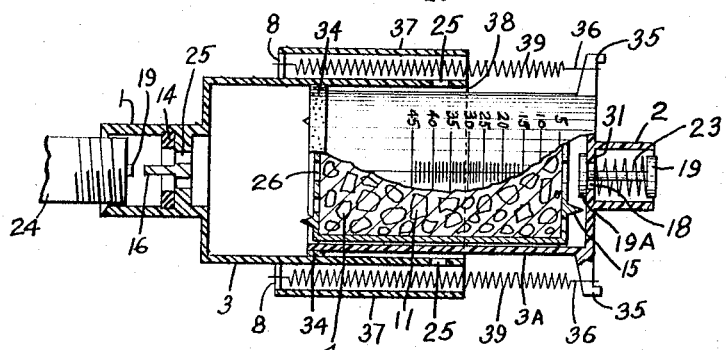
FIGURE 2 is a fragmentary longitudinal section, showing an air filter, in an air receptacle having 2 fittings adapted to be positioned between a tire valve stem of an inflatable tire and an air accumulator valve of a compressed air system, the air filter receptacle being in two sections, acting as an air pressure gauge and an air filter receptacle.
Figure 7:
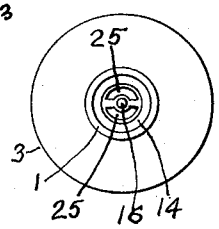

FIGURE 6 is a fragmentary longitudinal sectional view of a modified form of the invention shown in FIGURE 2;

FIGURE 7 is an end elevation looking in the direction of the arrow 7 in FIGURE 6;

In carrying out the invention referring now specifically to the drawing in FIGURE 1, there is provided a fitting 1 having centrally attached and positioned in its interior a fixed projection 16. Fitting 1 is of a diameter that allows a close encirclement of tire valve stem 24. Circular rubber or resilient washer 14 abutting circular shoulder of 16 under pressure of leading edge of 24 makes an airtight engagement between 24 and fitting 1, open and through ports 25 allows free air flow when 16 depresses 19 of 24. Fitting 2 is of a well known construction, it may be similar in design and function to a tire valve stem 24 found on inflatable tires, consisting of a compression spring 23 abutting on shoulders 31 and portion of valve stem 19, and keeps aperture 18 sealed by closure valve 19A, pressure on shoulders 31, fixed projection in air accumulator valve 20 when brought to pressure engagement with fitting 2 which is adapted to engage 20, depresses valve stem 19 allowing compressed air through aperture 18, opened by closure valve 19A to pass through porous air filter 4, containing dehydrating desiccant agents and ozone absorbent means through open ports 26, in fitting 1 into tire valve stem 24 of the inflatable tire. Pressure engagement of fitting 1 against leading edge of tire valve stem 24 of an inflated tire, depresses valve stem 19 by fixed projection 16, allows entrance of compressed air through open ports 25 into interior of air filter receptacle 3 into opening 5 of air pressure gauge 13, consisting of a well known combination of a piston 6, calibrated strip 7, compression spring 23 abutting against piston 6 and threaded core 10 engaging threaded portion of 13, that allows passage of 7 through shaped opening 17. Fixed stop 9 attached to 7 can abut against 10 limiting amount of compression of 23, the portion of calibrated strip 7 can extend beyond 6 and abut against wall of 13 to allow air space. Piston 6 may have a pliable oiled surface to fill the entire channel in 13 which is free of interior obstructions. Threaded cap 27 may have the outer surface knurled. Its inner threaded surface engages threaded portion 22, leading edge of filter receptacle 3, and sandwiching rubber or resilient washer 14 forming an air tight closure. Alnico magnet strips 21 can be on any external surface of the device to hold metal caps that some tire valve stems have, when the device is not in use. A form fitting cap 46 may be used to cap opening of fitting 1.

FIGURE 2 shows another embodiment of the device with a longitudinal portion cut away being used as an air pressure gauge, indicating the air pressure of an inflated tire, tire valve stem 24 being in pressure engagement with fitting 1. Fixed projection 16 depresses valve stem 19 of 24, compressed air filling the device through open ports 25. Air filter receptacle 3 and 3A can be cylindrical. 3A is positioned with its open end in the interior of 3. 3A is longitudinally and rotatably movable, and it is of a diameter allowing its insertion as shown in FIGURE 2. A circular strip 34 which can be of a felt type material can be attached to and encircle the leading open outer edge of 3A; strip 34, filling the space between the leading outer edge of 3A, is of a composition that allows its uninterrupted motion across the smooth inner surface of 3 creating an air tight seal pressed between 3 and 3A. Outer surface of 3A can have lbs. of air pressure in calibration that leading edge 38 of open end of 3 would show in alignment with said calibration. Coiled springs 39 are attached to an opening in projections 8 from the sides of 3 and sheaths 37 are longitudinal tubes attached to 3 with sufficient diameter to allow free movement of 39. Loops 36 of 39 are removably attachable to hooked projections 35 attached to 3A. Any number of open ports 25 arranged parallel to and in proximity to leading open edge 38 of 3 would prevent excess air pressure in the interior of device from overcoming the tension of stretching 39, causing separation of 3 from 3A. Fitting 2 which is of well known construction, may be similar in design and function to a tire valve stem such as 24, being normally kept closed by closure valve 19A under tension of compression spring 23 against shoulders 31 and valve stem 19. Air filter 4 may be of a diameter that allows a close engagement against the inner surfaces of 3A. 4 could have any number of projections 15 to keep 4 from blocking openings of 1 and 2 fittings, and 3, 3A and 4 may be transparent. 4 may have any type and number of pores or ports sufficient in diameter to contain its contents, and permit free air passage. The contents of the replaceable air filter may be silica gel, containing an indicator that changes color when absorptive capacity is reached. Any dehydrating agent may be used in powder, pellet, piece, porous molding or irregular lumps of any size or form, 4 may contain in addition any type of soluble in water dye means that would dissolve and indicate by coloring its absorptive level. 4 may have any number of channels 12 which could have baffles on the interior. 4 may contain a sheet of perforated foam rubber 32 or foam rubber in any form or any size. Particles of activated charcoal or any carbon derivative or any other ozone inhibitor may be used to absorb ozone.

Figure 3:
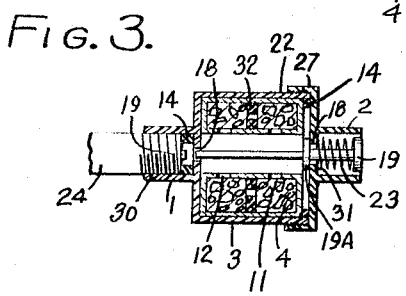
FIGURE 3 is a fragmentary longitudinal sectional view of a modified form of the invention.

In FIGURE 3 another embodiment of the invention shown in side view allows the device to be removably attachable to the tire valve stem 24 of an inflatable tire attached by threaded portion 30 to threaded portion of tire valve stem 24, whose leading edge sandwiches rubber or resilient washer 14 against shoulder of fitting 1. Threaded portion 30 may be in the interior of 3. Air filter receptacle 3 has air filter 4 enclosed. 3 and 4 may be transparent. Fitting 2 is well known being similar to fitting 2 in FIGURES 1 and 2. With the addition that 19 valve stem extends through perforated channel 12, through aperture 18, when fitting 2 is in pressure engagement with air accumulator valve 20, valve stem 19 being depressed, closure valve 19A leaves shoulders 31 leaving aperture 18 open for compressed air flow through perforated channel 12 into opening 24, 19 of 24 being depressed by extended 19 of fitting 2. Threaded cap 27 removably attached to threaded outer edge of filter receptacle 22 allows removal and changing of air filter 4. Rubber or resilient washer 14 could be between 22 and 27. Air filter 4 can contain any desiccant dehydrating agent 11, perforated foam rubber 32 or may contain activated charcoal any carbon derivative or any other ozone inhibitor.

Figure 4:
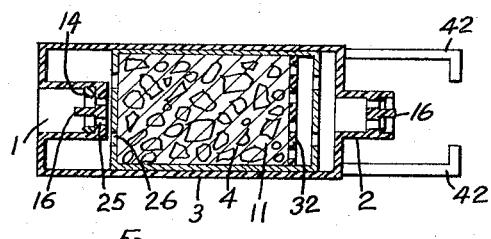
FIGURE 4 is a fragmentary sectional view of a further modification of the invention.

FIGURE 4 is another embodiment of the invention having fittings 1 and 2 adapted for placement between 24 and 20 in combination with air filter 4 which may contain any form of dehydrating desiccant agents ozone inhibitors water soluble dye 11 or any other moisture indicator. Fitting 2 may have a fixed projection 16 having open ports 25. The device may have any form of clamps 42 adapted for attachment to any portion of air accumulator system. 3 and 4 may be transparent. 3 may be adapted for separation to replace 4.

FIGURE 5 is still another embodiment of an air gauge means that could be used in combination with the device in FIGURE 1. Opening 5 could be on any portion of 3 between fittings 1 and 2. Expandable bellows 48, indicator 33 calibrated strips 7 in lbs. air pressure calibration, compression spring 23, fixed stop 9 make-up the apparatus. Yet another gauge could use the well known Bourdon tube at opening 5 transferring its motion by gears, levers or other mechanism to any indicator that could point to a calibrated dial in pressure units.

FIGURE 6 and FIGURE 2 are similar except the coiled spring 39 means is positioned in the interior in FIGURE 6 eliminating 8, 35 and 37, having similar filter means with spring 39 attached by loop 36 to opening in fixed projection 16, the other end to threaded open core 10, engaging threaded inner portion 30 of fitting 2. 3A is rotatably movable allowing engagement between 3A, 30 and 10.

It will be noted that each of the forms of the invention herein described embodies means which co-operate with the tire valve stem of an inflatable tire, and an air accumulator valve, which is the outlet fitting of a compressed air system found at gas stations to inflate tires. The form fitting cap 46 may be of a resilient plastic form to seal the opening in fitting 1, of FIGS. 1, 2, 4, and 6, preventing exposure of air filter 4, to moisture in atmosphere, when the device is not being used. It could be attached to fitting 1, by resilient loops or other means. Fitting 2, in FIGS. 1, 2, and 6 may have any well known press means of keeping aperture 18 closed, until in pressure engagement with an air accumulator valve, preventing exposure of the filter to atmosphere, and keeping the filter receptacle 3 air tight closed, when the device is being used as an air gauge.

Threaded cap 27, in FIGS. 1 and 3 can be of any form of closure means that are removably attachable, to permit replacement of the air filter. Alnico magnets 21 can be attached to any outer surface of the filter receptacle 3, in FIGS. 1, 2, 4, and 6. They may be attached in parallel strips, to allow attachment of a device to any suitable metal surface of the interior of a car, when not in use, and to hold the metal cap cover of the tire valve stem, while the device is being used on a tire. The air filters 4, in FIGS. 1, 2, 3, 4 and 5 are shown cylindrical, but may be any shape, allowing confinement and exposure of contents to a compressed air stream, and may be encircled by a soft ring or the like, that would hold the soft ring sandwiched between the air receptacle interior and the air filter. The compressed air flow could pass through any combination of pores, channels, or ports in air filter 4. While silica gel, indicating, other desiccant agents or moisture absorbing means are mentioned with activated charcoal, foam rubber and carbon derivatives, any combination of moisture absorbing means and ozone inhibitors or absorbents, could be used. The air filter may be porous paper or the like, which could contain desiccant and ozone absorbent means, and have any moisture soluble dye means, whose solubility by moisture could be visible through the transparent filter receptacle 3.

The filter receptacles 3, in FIGS. 1, 2, 3, 4 and 5, may be transparent plastic, to observe moisture absorbing progress of air filters 4, without opening the filter receptacle although any material could be used.

In FIG. 1, the air pressure gauge 13 can have an open port 25 at any point through wall of 13, and when the piston moves past port 25, compressed air in interior of filter receptacle 3 escapes through 25, relieving the pressure.

FIG. 4 shows a straight flow through filter with fittings 1 and 2 having fixed projections 16, with any form of clamp to attached to an air accumulator valve. It may contain any combination of desiccating, moisture, ozone absorbing means, moisture indicating means. Minus the clamping means 42, the combination of filter receptacle 3, moisture and ozone absorbing means, moisture indicating means, with fittings 1 and 2 adapted to pressure engagement with 20 and 24, may be a one use device. Filter receptacle 3 could be adapted to have access to air filter 4. In air filter 4, the contents 11 moisture absorbents and ozone absorbents and may be of any physical form to allow a free flow of the compressed air over their surfaces. Activated charcoal, foam rubber, or any other ozone absorbent or inhibitor 11, can be used in an air filter 4, in combination with an air accumulator system. At the compressor intake, ozone absorption would prevent damage to interior of rubber hoses of said systems.

The compression spring 23, and coiled spring 39 means tension, are in ratio to the indicating calibration in pounds pressure, when the device is in pressure engagement with an inflated tire. There could be any ratio between the opening 5 or any opening in 6, or any port opening or air escape ratio past 34.

FIGURES 2 and 6 show filter receptcle 3 and 3A in two sections in a piston within cylinder combination, while felt washer 34 or the like, may encircle the outer surface of 3A. A groove encircling outer surface of 3A could attachably accommodate 34, which could be of any material that could be compressible between 3 and 3A, yet move smoothly over the inner surface of 3.

In FIGURE 2, the sheaths 37, would protect both the coiled springs and the hand of the operator. Hooked projections 35, may be any holding means for loop 36, of coiled spring.

In FIGURE 3 closure valve 19A, under spring tension keeps aperture 18 closed, keeping air filter 4 from being exposed to atmosphere. Ftting 1 being in airtight engagement with 24, elongated valve stem 19 and closure valve 19A unit, is out of contact with 19 of 24, until air accumulator valve is brought to pressure engagement with fitting 2, depressing 19. Channel means could guide 19 and 19A to make engagement with 19 of 24.

In FIGURE 6 the combination of 3A, 2 can be rotated to engage channelled threaded core 10, fitting 2 could have an opening that could line up with an opening in 10, that could accommodate a cotter pin, or the like for safety engagement.

FIGURE 7 may be a head-on view of fitting 1 and air filter receptacle 3, of 1, 2, 4, and 6 showing the interior of fitting 1.

FIGURE 7 is an end elevation of FIGURE 6 facing fitting 1 air filter receptacle 3 resilient washer 14 fixed projection 16 and open ports 25. The device in FIGURES 1, 2, 3, 4, 5 and 6 may be in cylindrical form. A device may have fittings 1 and 2 with any portion of the air filter receptacle 3 of a bellows or accordion construction which would be held compressed by spring tension means, bellows elongating when fitting 1 would engage 24 having air pressure calibrating means to transfer elongation distance to indicate p.s.i. of air pressure. Fitting 2 could be the same as in FIGURE 1. It may have removably attachable threaded cap means for changing its air filter 4.

Air filter 4 could be of any shape adapted to be enclosed by an air filter receptacle 3 that would allow an air flow over the surfaces of silica gel indicating calcium hydroxide, sodium chloride or any other dehydrating agent, activated charcoal, foam rubber or any other ozone inhibitor 4 could be of porous paper enclosing 11 in any form. Any portion of 4 or its contents could contain a dye that may react to moisture by indicating visually its presence.

The foregoing is considered as illustrative only of the principles of the invention. Further, since numerous modifications and changes will readily occur to those skilled in the art it is not desired to limit the invention to the exact construction and operation shown and described and accordingly, all suitable modifications and equivalents may be resorted to falling within the scope of the invention as claimed.

Having thus completely and fully described the invention that now claimed as new is as follows:

1. A device for purifying air supplied to the valve stem of a tire consisting of a housing, a moisture absorbent in said housing, an air pressure gauge affixed to said housing and having a port in communication with the interior of said housing, a fitting at one end of said housing adapted to be fitted to said valve stem, a second fitting containing a valve means at the opposite end of said housing, said second fitting being adapted to receive a connecting means from a source of pressurized air, and means transmitting air pressure from said tire to said air pressure gauge.

2. A device as in claim 1, further characterized in that at least part of the absorbent is an absorber of ozone.

3. A device as in claim 1, further characterized in that the absorbent contains a humidity indicator and at least a part of the housing is transparent.

4. A device as in claim 1, further characterized in that the absorbent is enclosed in a removable container.

5. A device as in claim 1, further characterized in that said housing elongates to form said air pressure gauge means.

References Cited by the Examiner

UNITED STATES PATENTS

| | | | |
|---|---|---|---|
| 1,297,741 | 3/1919 | Schweinert | 137—229 |
| 1,622,341 | 3/1927 | Platt | 137—229 |
| 2,528,539 | 11/1950 | Norgren et al. | 55—275 |
| 3,140,603 | 7/1964 | Williams | 73—146.3 |
| 3,144,314 | 8/1964 | Jackson | 55—275 |
| 3,152,977 | 10/1964 | Kaufman | 55—388 |

REUBEN FRIEDMAN, *Primary Examiner.*

J. ADEE, *Assistant Examiner.*